US012792538B2

(12) United States Patent
Paturu et al.

(10) Patent No.: US 12,792,538 B2
(45) Date of Patent: Nov. 10, 2026

(54) UTILIZING KERNEL THREAD DISPATCH LATENCY FOR INPUT/OUTPUT PROCESSING

(71) Applicant: INTERNATIONAL BUSINESS MACHINES CORPORATION, Armonk, NY (US)

(72) Inventors: Chaitanya Paturu, Hyderabad (IN); Sanket Rathi, Hyderabad (IN); Phani Kumar V. U. Ayyagari, Hyderabad (IN); Ramesh Kumar Marupaka, Hyderabad (IN); Nidhyanandhan Arumugam, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/920,321

(22) Filed: Oct. 18, 2024

(65) Prior Publication Data

US 2026/0111375 A1 Apr. 23, 2026

(51) Int. Cl.
*G06F 13/24* (2006.01)

(52) U.S. Cl.
CPC ...... *G06F 13/24* (2013.01); *G06F 2213/2414* (2013.01)

(58) Field of Classification Search
CPC ................................ G06F 9/546; G06F 13/24
See application file for complete search history.

(56) References Cited

U.S. PATENT DOCUMENTS

| | | | |
|---|---|---|---|
| 6,732,138 B1 | 5/2004 | Browning et al. | |
| 7,865,679 B2 | 1/2011 | Sartore | |
| 9,336,168 B2 | 5/2016 | Liu et al. | |
| 9,411,636 B1 * | 8/2016 | Ting | G06F 9/4881 |
| 10,579,416 B2 | 3/2020 | Jaloma et al. | |
| 11,074,101 B2 | 7/2021 | Accapadi et al. | |
| 2007/0168525 A1 * | 7/2007 | DeLeon, III | G06F 9/546 709/228 |
| 2013/0254477 A1 * | 9/2013 | Swanson | G06F 21/79 711/112 |

(Continued)

FOREIGN PATENT DOCUMENTS

| | | | |
|---|---|---|---|
| EP | 0272879 | A2 | 6/1988 |

OTHER PUBLICATIONS

Kuhns et al., "The Design and Performance of a Real-time I/O Subsystem," Published in: Proceedings of the Fifth IEEE Real-Time Technology and Applications Symposium, Jun. 4, 1999, Vancouver, BC, Canada, Date Added to IEEE Xplore: Aug. 6, 2002, DOI: 10.1109/RTTAS.1999.777670, 10 pages.

*Primary Examiner* — Getente A Yimer
(74) *Attorney, Agent, or Firm* — Onyx IP Group

(57) ABSTRACT

Utilizing kernel thread dispatch latency for input/output processing is disclosed, including executing an interrupt handler in response to an interrupt raised by an I/O adapter; dispatching, by the interrupt handler, a kernel thread configured for I/O processing; processing, by the interrupt handler while waiting for an acknowledgement by the kernel thread, one or more I/O events of a plurality of I/O events in an I/O queue for the I/O adapter; transferring, by the interrupt handler, the I/O processing to the kernel thread in response to detecting the acknowledgement by the kernel thread; and processing, by the kernel thread, remaining I/O events in the I/O queue.

20 Claims, 5 Drawing Sheets

(56) References Cited

U.S. PATENT DOCUMENTS

| | | | | |
|---|---|---|---|---|
| 2015/0089011 | A1* | 3/2015 | Alanis | G06F 15/17331<br>709/212 |
| 2020/0125395 | A1* | 4/2020 | Accapadi | G06F 13/24 |

* cited by examiner

UTILIZING KERNEL THREAD DISPATCH LATENCY FOR INPUT/OUTPUT PROCESSING

BACKGROUND

The present disclosure relates to methods, apparatus, and products for utilizing kernel thread dispatch latency for input/output processing. Input/Output ('I/O') devices signal the completion of an I/O operation to a processor using interrupts. Upon receiving the interrupt, the processor preempts a running application to process the I/O event. When running I/O-heavy workloads, workload preemption and the latency resulting from I/O processing can severely impact the performance of the system.

SUMMARY

According to embodiments of the present disclosure, various methods, apparatus and products for utilizing kernel thread dispatch latency for input/output processing are described herein. In some aspects, utilizing kernel thread dispatch latency for input/output processing includes executing an interrupt handler in response to an interrupt raised by an I/O adapter. The interrupt handler dispatches a kernel thread configured for I/O processing. The interrupt handler processes, while waiting for an acknowledgement by the kernel thread, one or more I/O events of a plurality of I/O events in an I/O queue for the I/O adapter. The interrupt handler transfers the I/O processing to the kernel thread in response to detecting the acknowledgement by the kernel thread. The kernel thread processes remaining I/O events in the I/O queue. In this way, I/O is processed continuously but a running process is only preempted for the time it takes for the kernel thread to begin executing.

DETAILED DESCRIPTION

Figure 1:
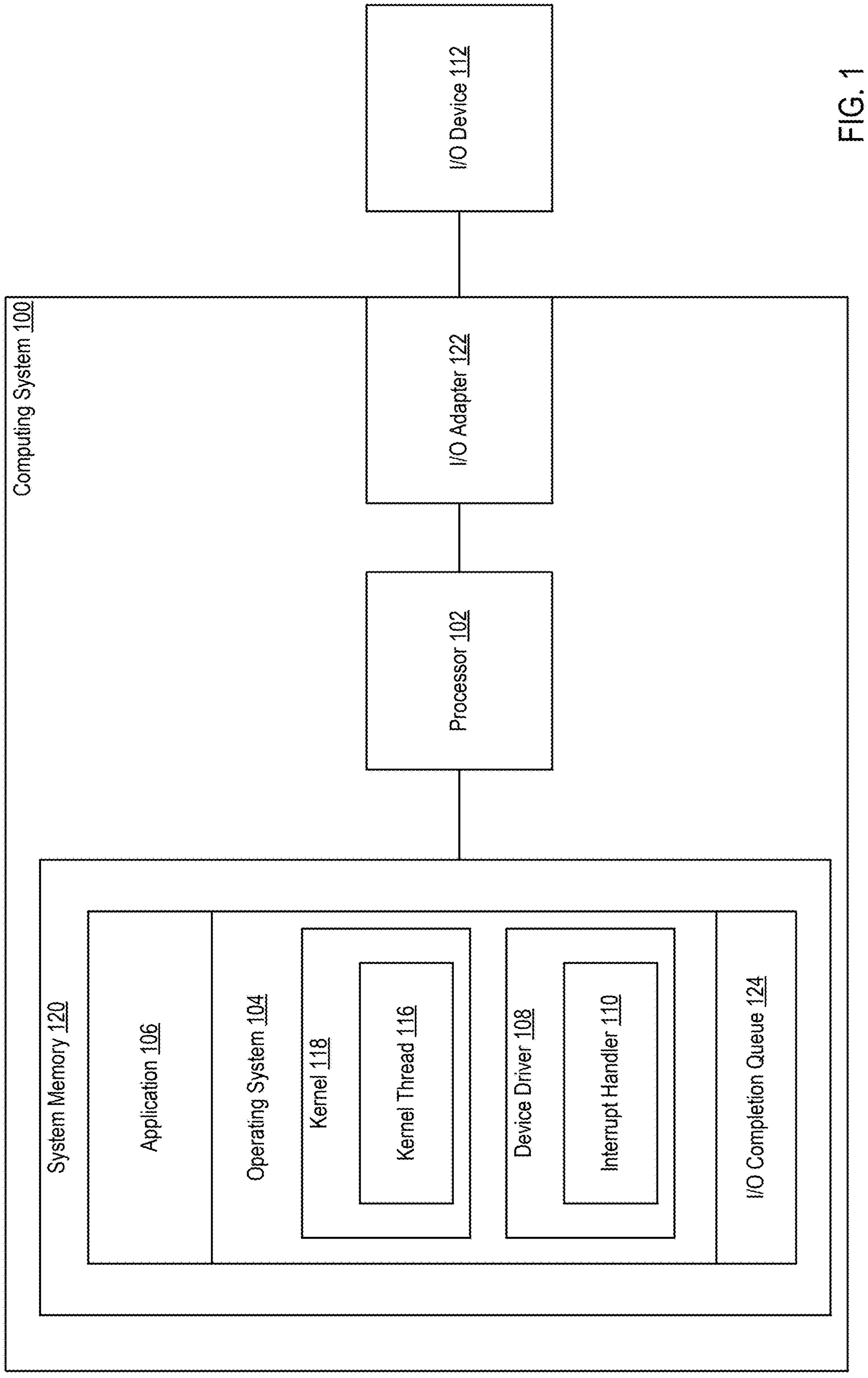
FIG. 1 sets forth a block diagram of an example computing system for utilizing kernel thread dispatch latency for input/output processing in accordance with at least one embodiment of the present disclosure.

An input/output 'I/O' adapter is a hardware component that facilitates communication between the computer's central processing unit (CPU) and peripheral devices such as storage drives, network interfaces, displays, and input devices (keyboards, mice). It acts as an intermediary that converts data and commands from the CPU into a form that the peripheral device can understand and vice versa. An I/O adapter handles the transfer of data between the CPU and the peripheral device. This may involve converting data formats, buffering, or handling protocols specific to the connected device. I/O adapters translate signals from the CPU (which may be in digital form) into signals that can be understood by the peripheral device, which might use different signaling methods (e.g., analog or digital). I/O adapters manage the communication protocols required for the specific device, controlling device operations like read/write actions, starting or stopping devices, and handling device-specific error conditions.

An I/O adapter is associated with a device driver that manages the I/O adapter's interaction with the operating system. The operating system, in turn, oversees interactions with applications running on the system. For instance, when a data packet is sent or received, the I/O adapter must notify the relevant application once processing is complete. This could be either the application that sent the packet (outbound) or the one destined to receive it (inbound). Notifications from I/O adapters to the processor are primarily handled through interrupts. When an event occurs that needs to be communicated to an application, the I/O adapter generates an interrupt and sends it to processor. Depending on the interrupt's priority, the processor may halt current operations, save its state, and execute an interrupt handler to address the event. The device driver typically includes an interrupt handler that manages the interrupt event. This handler, also known as an interrupt service routine (ISR), is a callback function that runs when an interrupt is triggered. Interrupt handlers perform various functions depending on the interrupt.

When a device completes a requested I/O operation, the I/O adapter updates a completion queue of the device driver for the device to indicate the I/O operation has completed. For example, the completion queue may be updated by inserting an entry for the I/O completion event into the completion queue, also referred to simply as an 'I/O completion.' The I/O adapter then signals an interrupt so that the interrupt handler of the device driver will check the completion queue. The I/O completion is then processed. Processing an I/O completion can include notifying an application thread that an I/O operation has completed, writing data associated with the I/O operation to a data buffer, responding to an error indicated for the I/O operation, and so on. Consider an example where a data packet is received by a network adapter. The network adapter inserts an entry for the received packet into an I/O completion queue and signals an interrupt to the processor. The processor loads the interrupt handler of the device driver for the network adapter, which detects the entry in the I/O completion queue. The I/O completion is processed by writing the packet data to a buffer associated with an application.

High-speed I/O adapters such as Fibre Channel adapters can generate a high rate of interrupts for the operating system. As network speed increases, so does the frequency of events and, consequently, the number of interrupts. I/O adapters can use various methods to handle interrupts. For example, in an interrupt model, an I/O adapter driver can execute code to process an I/O completion event on the CPU when the CPU is interrupted. In the interrupt model, once a device interrupts for I/O completion, I/O processing happens in the same interrupt context. Alternatively, in a kernel thread model, the interrupt handler can dispatch a kernel thread that processes the I/O completion event. Thus, in the kernel thread model, the interrupt handler wakes up a particular kernel thread for I/O processing and then returns, without processing any I/Os, while the I/O processing occurs in the kernel thread. Each method has its advantages and disadvantages; although, with multi-interrupt and muti-queue systems, many I/O drivers have migrated their I/O processing implementations from the interrupt model to the kernel thread model.

An advantage of the interrupt model is that the interrupt handler processes the I/O completions in the same context and can therefore complete the processing of the I/O operations relatively quickly. However, under heavy-burst I/O workloads, I/O processing in the interrupt handler can have a negative impact on system performance. Interrupts preempt running workloads. This causes a performance decrease in the workloads, and no new I/O requests can be submitted by an application while the application remains preempted by the interrupt. The performance impact of I/O processing in the interrupt handler has caused a shift toward the kernel thread model.

An advantage of the kernel thread model is that the interrupt handler is allowed to return as soon as the kernel thread is called and thus there is a shorter time period in which workloads may be preempted by the interrupt. However, the kernel thread model may cause a delay in I/O completion processing because of dispatch latency. When the interrupt handler calls a kernel thread to handle the I/O processing, the kernel thread processes work items from the I/O completion queue. If the kernel thread is in a sleep state, a dispatcher must place it in a run queue of the processor where it waits until the kernel thread is actually scheduled on the processor. Thus, there is a delay, or dispatch latency, between the time the interrupt handler dispatches the kernel thread and the time that the kernel thread is executed on the processor and begins processing I/O completions. This dispatch latency increases the overall latency in processing I/Os.

In accordance with embodiments of the present disclosure, a hybrid approach is employed in which the interrupt handler wakes up a kernel thread in response to an interrupt and also parallelly processes some of the I/O completions associated with the interrupt. If the kernel thread is not already executing, the interrupt handler issues a wakeup call to the kernel thread and parallelly begins processing I/O completions until the kernel thread begins executing. When the interrupt handler detects that the kernel thread is executing, the interrupt handler hands over the I/O processing to the kernel thread and exits. In this way, I/O processing is continuous and no I/O processing latency due to the kernel thread wakeup will be observed.

For further explanation, FIG. 1 sets forth an example computing system 100 for utilizing kernel thread dispatch latency for input/output processing in accordance with at least one embodiment of the present disclosure. Computing system 100 includes a processor 102 configured to execute an operating system 104, one or more applications 106 that are loaded from persistent storage into system memory 120 for execution by the processor 102. In various examples, processor 102 can be a CPU, a GPU, or other processing circuitry and may include one or more processor cores. In some examples, processor 102 can include a set of individual processors that share at least some resources. The operating system 104 may include a kernel 118 for system control of the processor. The kernel 118 is the core component of an operating system that manages hardware resources and enables communication between hardware and software. The kernel 118 manages processes, including creating, scheduling, and terminating them. It decides which processes get processor time, handles multitasking, and ensures that processes don't interfere with each other. The kernel 118 controls communication between the processor and peripheral devices (e.g., hard drives, printers, and network cards) through device drivers. The kernel 118 handles input and output operations, such as reading data from storage devices or sending data to a display or printer. The kernel abstracts these operations, allowing applications to interact with devices without needing to know their details. The kernel 118 also assists in managing interrupts. When an interrupt occurs, the kernel 118 pauses the current task to handle the interrupt and then resumes its previous activity. In other variations, the system control functionality of the kernel 118 may be implemented by computer program module other than the operating system 104, such as a hypervisor, system controller, and the like.

The computing system 100 includes one or more physical I/O adapters 122 as part of an I/O subsystem. The I/O adapters 122 are devices that communicatively couple the computing system 100 to one or more I/O devices 112 via one or more links between the I/O adapter 122 and the I/O device 112. An I/O device 112 can be, for example, a user input/output device (e.g., keyboard, mouse, display, speaker, microphone, etc.), persistent storage (e.g., a hard disk, solid state disk, etc.), volatile system memory (e.g., DRAM), peripheral devices (e.g., printers, scanners, etc.), network adapters (e.g., Ethernet adapters, Fibre Channel adapters), and the like. The links can include physical and wireless links that implement particular protocols (e.g., SCSI, USB, Fibre Channel, WiFi, etc.). In a particular example, an I/O adapter 122 is communicatively coupled to the processor 102 by a host bus (e.g., a PCIe bus) and thus may be referred to as a host bus adapter.

Requests from an application 106 or the operating system 104 to access a particular I/O device 112 are handled through that I/O device's device driver 108. The device driver 108 may be, for example, a module of computer program instructions that execute on the processor 102. Device drivers 108 may be modules of the operating system 104 as shown in FIG. 1, or may be executed independent of the operating system 104 depending on the implementation. The device driver 108 exposes an interface to the applications 106 and operating system for accessing the corresponding device 112. The I/O adapters 122 transform the control instructions from the device drivers 108 into protocol commands consistent with link and device protocols.

The I/O adapter 122 and device driver 108 are associated with one or more I/O completion queues 124. For example, the device driver 108 initializes an I/O completion queue 124 and communicates identifying information for the I/O completion queue 124 to the I/O adapter 122. For example, the I/O completion queue may be allocated in an area of system memory 120. The I/O adapter 122 updates the I/O completion queue with an entry for an I/O completion event.

A device driver 108 includes one or more interrupt handlers 110. The interrupt handlers may be a module of computer program instructions that executes on the processor 102. For example, the interrupt handler 110 may be stored in persistent storage and loaded into system memory 120 at system initialization. Various interrupt handlers 110 may be executed in dependence upon the type of interrupt. At least one interrupt handler 110 is invoked when an I/O adapter 122 raises an interrupt on the processor 102. The processor 102 executes the interrupt handler 110 corresponding to, for example, an interrupt identifier. The processor 102 may include its own interrupt handler, implemented in hardware logic or firmware, for determining which software-based interrupt handler 110 to execute according to the interrupt. In a particular example, the interrupt handler 110 handles interrupts related to I/O completion events. Upon being called to handle the interrupt, the interrupt handles detects whether there are I/O completions, or 'work items,' in the I/O completion queue 124.

At a low level, a hardware interrupt is a hardware signal from an I/O device 112 to the processor 102. An interrupt tells the processor that the device needs attention and that the processor should stop any current activity and respond to the device. If the processor is not performing a task that has higher priority than the priority of the interrupt, then the processor suspends the current thread. The processor then invokes the interrupt handler for the device that sent the interrupt signal. The job of the interrupt handler is to service the device and stop the device from interrupting. When the interrupt handler returns, the processor resumes the work it was doing before the interrupt occurred.

The kernel 118 initializes one or more kernel threads 116. For example, kernel threads 116 may be initialized at startup but may also be created during runtime. Kernel threads 116 can be created by a function call to the kernel API. Kernel threads 116 are initialized to a sleep state. To dispatch a kernel thread 116, a process calls a wakeup function in the kernel API with arguments for function, such a data structure or queue from which the kernel thread processes work items. Kernel threads 116 execute in the kernel space in privileged mode rather than in the user space. Thus, kernel threads 116 have full access to the kernel data structures. Kernel threads 116 are often used to implement background tasks inside the kernel 118. These tasks can be, for example, handling of asynchronous events, waiting for an event to occur, processing interrupts, or writing buffered data to disk. Device drivers can utilize the services of kernel threads 116 to handle such tasks through calls to the kernel API. Kernel threads 116 execute in a process context and thus are scheduled on a run queue just like other process tasks. It will be appreciated that, in a symmetric multiprocessing architecture, a kernel thread 116 can be scheduled on any core in the processor and not just the core executing the context from which the kernel thread 116 was dispatched. Because kernel threads 116 are scheduled like other processes, there is an inherent latency between the time of waking up the kernel thread 116 and the time at which the kernel thread 116 is scheduled for execution on the processor 102. When a kernel thread 116 is finished executing the task, the kernel thread exits and returns to the sleep state.

As previously mentioned, in the conventional kernel thread model, the interrupt handler 110 can use kernel threads to handle I/O processing. The interrupt handler 110 can dispatches a kernel thread 116 for I/O processing by issuing a wakeup call to the kernel thread 116. The interrupt handler 110 then waits for an acknowledgement from the kernel thread 116. Once the kernel thread 116 wakes up, the kernel thread 116 will begin processing I/O completions from the I/O completion queue 124 and the interrupt handler 110 will exit. The kernel thread 116 will then acknowledge the processing of the I/O completions to the I/O adapter 122.

In accordance with the present disclosure, when the interrupt handler 110 is called to handle an interrupt, the interrupt handler 110 dispatches a kernel thread 116 but also begins processing the I/O completions from the I/O completion queue associated with I/O adapter 122. When the interrupt handler 110 receives an acknowledgement from the kernel thread 116 indicating that the kernel thread 116 is currently executing, the interrupt handler 110 transfers the I/O processing for the interrupt to the kernel thread 116. The kernel thread 116 then begins processing the remaining I/O completions from the I/O completion queue. When the kernel thread 116 is finished processing I/O completions, the kernel thread 116 exits and returns to a sleep state. In this way, the I/O processing job does not experience the dispatch latency associated with the kernel thread 116 because the interrupt handler 110 is processing the I/O completions while the kernel thread 116 is being scheduled. Conversely, the amount of time that a process remains preempted on the processor due to the interrupt is shorter than if the interrupt handler 110 were to perform the I/O processing itself, such as described above in the interrupt model. In some cases, where there are relatively few I/O completions, the interrupt handler 110 might complete the I/O processing before the kernel thread 116 begins executing, in which case the kernel thread 116 identifies that there are no more work items in the queue and simply exits.

In a particular example, a device 112 raises an interrupt to the I/O adapter 122 for the device 112. The I/O adapter 122 raises an interrupt to the processor with an interrupt identifier. For example, the I/O adapter 122 may raise the interrupt to the processor over an interrupt request (IRQ) line. The processor 102 then preempts execution of the currently running process and executes the interrupt handler 110 associated with the interrupt. As previously discussed, device drivers 108 and interrupt handlers 110 are loaded into system memory 120 at system initialization. At execution of the interrupt handler 110, the interrupt handler 110 dispatches a kernel thread 116. For example, the interrupt handler dispatches the kernel thread 116 through a call to the kernel API. The call can be, for example, a call to wake up an already-initialized kernel thread or a call to create and run a new kernel thread. In some implementations, the kernel thread 116 has been initialized specifically for handling interrupts associated with that interrupt handler. In these implementations, the interrupt handler 110 dispatches the thread that is already associated with the interrupt handler 110. In some cases, the kernel thread 116 may be already executing on a different core or processor than the core processor on which the interrupt was signaled. If the kernel thread 116 is not currently executing, a dispatcher in the kernel 118 schedules the kernel thread 116 for execution on the processor 102. For example, the kernel thread 116 is placed as an entry in a run queue for the processor 102.

Once the interrupt handler 110 handler has dispatched the kernel thread 116, the interrupt handler 110 processes the first I/O completion from the I/O completion queue associated with the I/O adapter 122. In some implementations, the before I/O processing begins, the interrupt handler 110 places a lock on the I/O queue. For example, the interrupt handler 110 can set a flag for the I/O queue indicating the I/O queue is locked, although it will be appreciated that any type of lock can be employed. After processing the first I/O completion, the interrupt handler determines whether it has received an acknowledgement from the kernel thread 116. In some implementations, the kernel thread 116 provides the acknowledgement by setting a flag that is readable by the interrupt handler 110. The interrupt handler 110 polls for this flag to determine whether the kernel thread 116 is executing. In some instances, the kernel thread may be already executing. If the interrupt handler 110 has not detected an acknowledgement from the kernel thread 116, the interrupt handler 110 processes the next I/O completion from the I/O completion queue. The flow of processing an I/O completion from the I/O completion queue and determining whether the kernel thread 116 is executing continues until the acknowledgment from the kernel thread 116 has been detected. Once the acknowledgment is detected, the interrupt handler 110 can exit.

Once the kernel thread 116 is woken up and begins executing, the kernel thread 116 signals an acknowledgement to the interrupt handler 110, for example, by setting a flag indicating that the kernel thread 116 is executing. The kernel thread 116 then waits for the interrupt handler 110 to pass control of the I/O completion queue 124 to the kernel thread 116. For example, in response to detecting the acknowledgement from the kernel thread 116, the interrupt handler may discontinue further I/O processing and release the lock on the I/O completion queue 124. The kernel thread 116 can inspect the lock state on the I/O completion queue 124 and, once the lock is removed, begin processing I/O completions if there are any remaining I/O completions in the I/O completion queue 124. In some examples, the kernel thread 116 may be already initialized and dedicated to processing items from a particular completion queue and/or I/O adapter. Once there are no more work items in the completion queue and the I/O processing by the kernel thread 116 has completed, the kernel thread 116 sends an acknowledgement to the I/O adapter for the I/O events. The kernel thread 116 then exits, returning to the sleep state. However, if the interrupt handler 110 completes all work items in the completion queue prior to receiving the acknowledgement from the kernel thread 116 that the kernel thread 116 is executing, the interrupt handler 110 will send the acknowledgement to the I/O adapter after processing all of the I/O completions.

In some implementations, the interrupt handler 110 and the kernel thread share a completion queue counter. As the interrupt handler 110 processes I/O completions, the interrupt handler 110 increments the shared completion queue counter for each I/O completion processed. When the kernel thread 116 takes over the I/O processing, the kernel thread 116 can read the counter to determine how many I/O completions have been processed and thus where in the queue to begin processing I/O completions. The kernel thread 116 will also increment the shared completion queue counter for each I/O completion processed. The kernel thread 116 will acknowledge the I/O completions processed by both the interrupt handler 110 and the kernel thread 116 to the I/O adapter 122. In some example, the acknowledgement identifies the aggregate number of I/O completions processed by both the interrupt handler 110 and the kernel thread 116.

Figure 2:
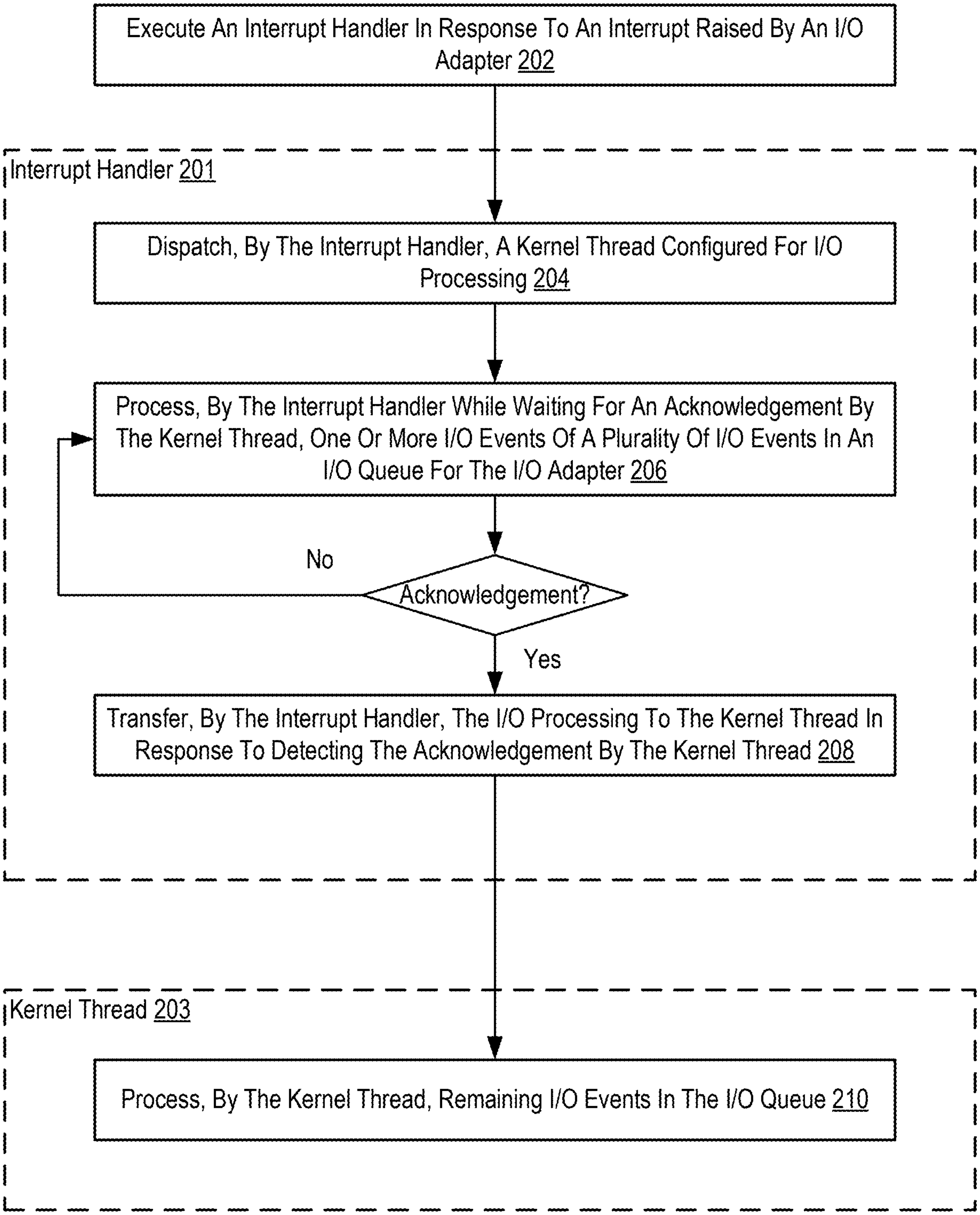
FIG. 2 sets forth a flow chart of an example method of utilizing kernel thread dispatch latency for input/output processing in accordance with at least one embodiment of the present disclosure.

For further explanation, FIG. 2 sets forth an example flow chart of an example method of utilizing kernel thread dispatch latency for input/output processing in accordance with at least one embodiment of the present disclosure. The example of FIG. 2 includes an interrupt handler 201 and a kernel thread 203. In some examples, the interrupt handler 201 and kernel thread can include some or all of the features and characteristics described above with reference to the interrupt handler 110 and kernel thread 116 of FIG. 1. The method of FIG. 2 includes executing 202 an interrupt handler in response to an interrupt raised by an I/O adapter. In some examples, a device coupled to a computing system needs attention from the processor to handle I/O events, the device raises an interrupt to an I/O adapter that interfaces the device with the computing system. For example, the device may signal an interrupt when an I/O operation has completed, either to provide input data to the computing system or acknowledge output data sent to the device. In turn, the I/O adapter raises an interrupt to the processor, for example, over the host bus. The processor then preempts execution of the currently running process and executes an interrupt handler 201 for responding to the interrupt. In some examples, the interrupt hander 201 is a component of a device driver for the I/O adapter, or is otherwise dedicated to handling interrupts raised by the I/O adapter. Before signaling an interrupt to the I/O adapter, the device places data related to I/O events in an I/O queue. The I/O queue is associated with the I/O adapter and the device driver for the adapter, and the corresponding interrupt handler is configured to detect when data is present in the I/O queue. In some examples, the I/O events are I/O completions and the I/O queue is an I/O completion queue that is used by the I/O device to notify the computing system that the I/O device has completed the I/O operations.

The method of FIG. 2 also includes dispatching 204, by the interrupt handler 201, a kernel thread 203 configured for I/O processing. In some examples, there are one or more kernel threads dedicated to processing I/O events on the I/O queue for a particular I/O adapter. Those kernel threads are initialized by the operating system and exist in a sleep state until invoked. For example, the kernel thread 203 may have been initialized at system startup. In some examples, the interrupt handler 201 dispatches 204 the kernel thread by invoking a wakeup call to the kernel thread 203 through the kernel API. The kernel thread 203, once dispatched, must be scheduled to run on the processor. For example, in response to the wakeup call to the kernel thread, the kernel dispatcher may place the kernel thread 203 on the run queue for the processor. In accordance with scheduling policies, the kernel thread 203 will be picked from the run queue and executed on the processor. In some implementations, once the kernel thread 203 begins execution, a flag bit is set in a status register.

The method of FIG. 2 also includes processing 206, by the interrupt handler 201 while waiting for an acknowledgement by the kernel thread 203, one or more of a plurality of I/O events in an I/O queue for the I/O adapter. The interrupt handler 201 does not wait for the kernel thread 203 to launch to process the I/O events. Instead, the interrupt handler 201 processes 206 one or more I/O events in the I/O queue while it waits for the kernel thread 203 to launch. In some examples, the interrupt handler 201 processes the one or more I/O events of the plurality of I/O events in the I/O queue by processing one or more I/O completions from the I/O completion queue. Processing an I/O completion can include, for example, notifying an application that the device has completed the I/O operation, writing I/O return data to a data buffer, responding to an error identified by the I/O completion, and so on. In some implementations, the interrupt handler 201 determines whether the kernel thread 203 has begun executing after each I/O event that it processes. If the acknowledgement has not been detected, the interrupt handler continues to process I/O events. The acknowledgement by the kernel thread can be detected, for example, by checking for a bit flag in a status register. In some implementations, the interrupt handler 201 updates a global counter for each I/O event that it processes for the interrupt. In some implementations, the interrupt handler 201 places a lock on the I/O queue before beginning to process the I/O events. The lock can be indicated, for example, as a flag bit set for the I/O queue.

The method of FIG. 2 also includes transferring 208, by the interrupt handler 201, the I/O processing to the kernel thread 203 in response to detecting the acknowledgement by the kernel thread 203. Once the interrupt handler 201 detects that the kernel thread 203 is executing, for example, by detecting that a flag is set for the kernel thread 203, the interrupt handler 201 can hand off the I/O processing for the interrupt to the kernel thread 203. In some examples, the interrupt handler 201 transfers 208 the I/O processing for the interrupt to the kernel thread 203 by discontinuing its processing of I/O events from the I/O queue and indicating that its has discontinued processing. For example, the interrupt handler 201 can indicate this by releasing the lock on the I/O queue or by setting or unsetting another type of flag, or simply by exiting.

The method of FIG. 2 also includes processing 210, by the kernel thread 203, remaining I/O events in the I/O queue. Once the kernel thread 203 detects that the interrupt handler 201 has discontinued I/O processing, the kernel thread determines whether there are any remaining I/O events in the I/O queue. If so, the kernel thread 203 can continue where the interrupt handler 201 stopped. In some examples, the kernel thread 203 processes 210 the remaining I/O events in the I/O queue by processing I/O completions in the I/O queue, in the same way that the interrupt handler 201 processed I/O events, i.e., by acknowledging I/O completions, writing I/O data to data buffers, processing errors, and so on. In some examples, the kernel thread 203 reads the global counter to determine the last I/O event processed by the interrupt handler 201 and begins its I/O processing with the next I/O event and continues until all of the remaining I/O events I/O queue are processed (e.g., until all I/O completions in the I/O completion queue have been processed). The kernel thread 203 updates the global counter for each I/O event that it processes.

Figure 3:
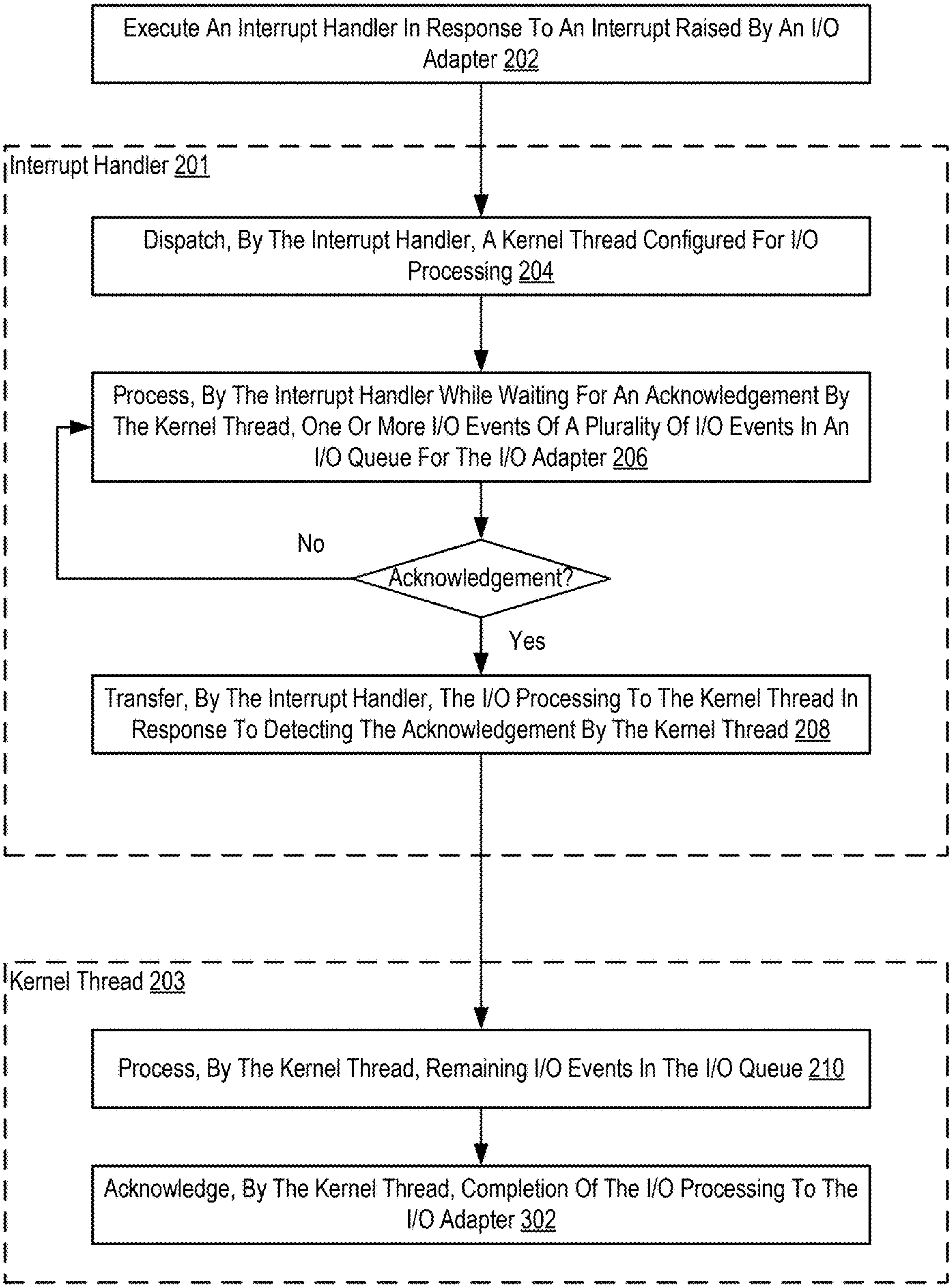
FIG. 3 sets forth a flow chart of another example method of utilizing kernel thread dispatch latency for input/output processing in accordance with at least one embodiment of the present disclosure.

For further explanation, FIG. 3 sets forth a flow chart of another example method of utilizing kernel thread dispatch latency for input/output processing in accordance with at least one embodiment of the present disclosure. The example method of FIG. 3 extends the method of FIG. 2 in that the method of FIG. 3 also includes acknowledging 302, by the kernel thread 203, completion of the I/O processing to the I/O adapter. In some examples, the kernel thread 203 acknowledges 302 that it has completed the processing of all of the I/O events in the I/O queue by sending a message to the I/O adapter via the host bus. In some implementations, the acknowledgment indicates the number of I/O events processed including those processed by the interrupt handler 201. For example, the number of I/O events processed can be determined from the global counter shared by the interrupt handler 201 and the kernel thread 203.

Figure 4:
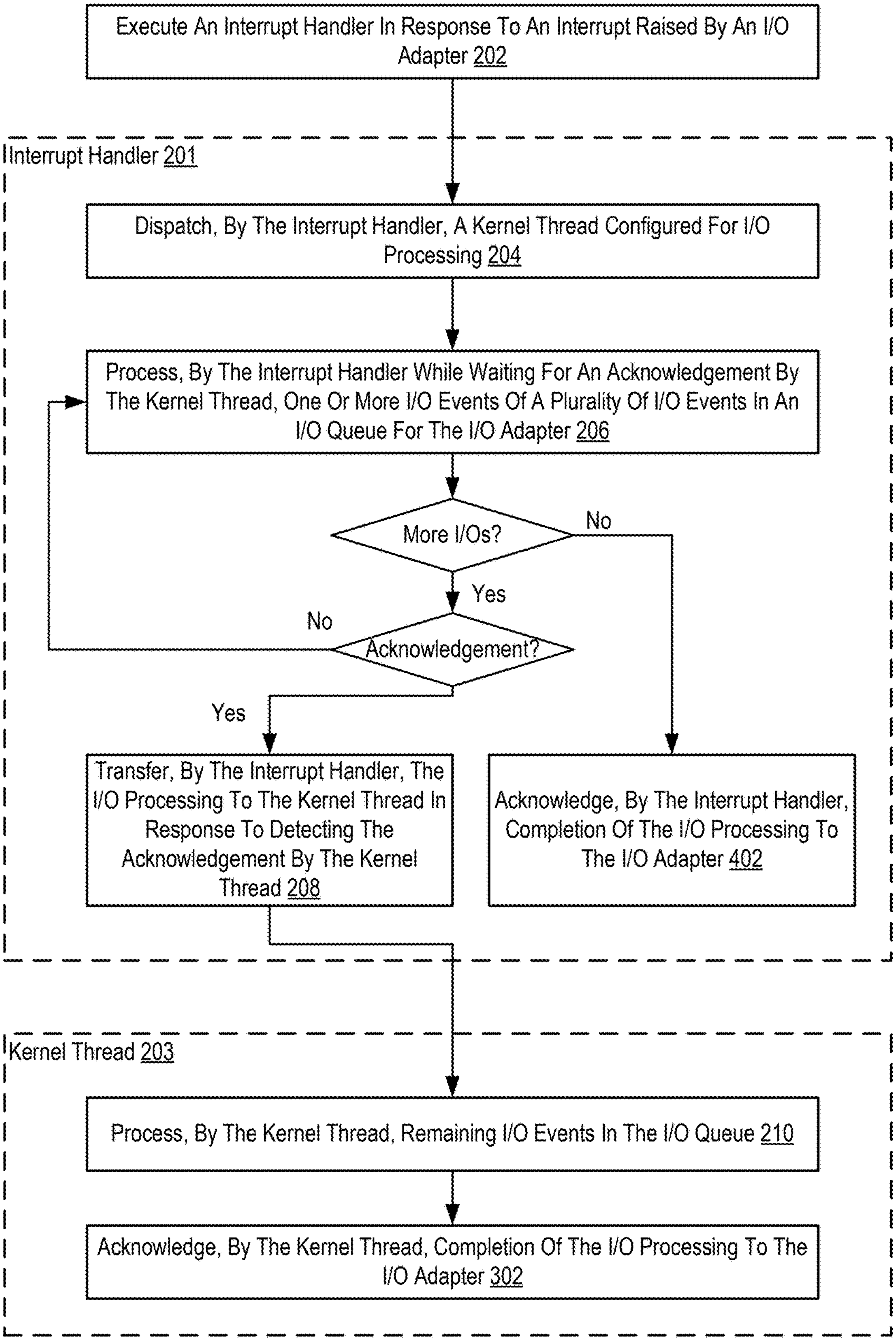
FIG. 4 sets forth a flow chart of another example method of utilizing kernel thread dispatch latency for input/output processing in accordance with at least one embodiment of the present disclosure.

For further explanation, FIG. 4 sets forth a flow chart of another example method of utilizing kernel thread dispatch latency for input/output processing in accordance with at least one embodiment of the present disclosure. The method of FIG. 4 includes acknowledging 402, by the interrupt handler 201 completion of the I/O processing to the I/O adapter when the interrupt handler processes all I/O events in the I/O queue prior to detecting the acknowledgement by the kernel thread 203. In some cases, the interrupt handler 201 could process all of the I/O events in the I/O queue before the kernel thread wakes up. For example, there may be no I/O completions in the I/O queue by the time the kernel thread 203 is executing. In such cases, the interrupt handler acknowledges 402 completion of the I/O processing to the I/O adapter when the interrupt handler processes all I/O events in the I/O queue prior to detecting the acknowledgement by the kernel thread. When the kernel thread 203 wakes up, it will detect that there are no I/O events in the I/O queue and will return to the sleep state.

In view of the foregoing, it will be appreciated that utilizing kernel thread dispatch latency for input/output processing in accordance with the present disclosure provides a number of improvements to a computing system including minimizing the I/O latency in the kernel thread I/O processing model by utilizing the interrupt handler to processing some of the I/O events until the kernel thread starts running. This enables continuous I/O processing even during the kernel thread wakeup time (dispatch latency), thus reducing the overall I/O latency in workloads and improving the performance of the computing system. While a running process may remain preempted for slightly longer than in the conventional kernel thread model, when running an I/O heavy workload the overall performance of the system is greatly improved.

Figure 5:
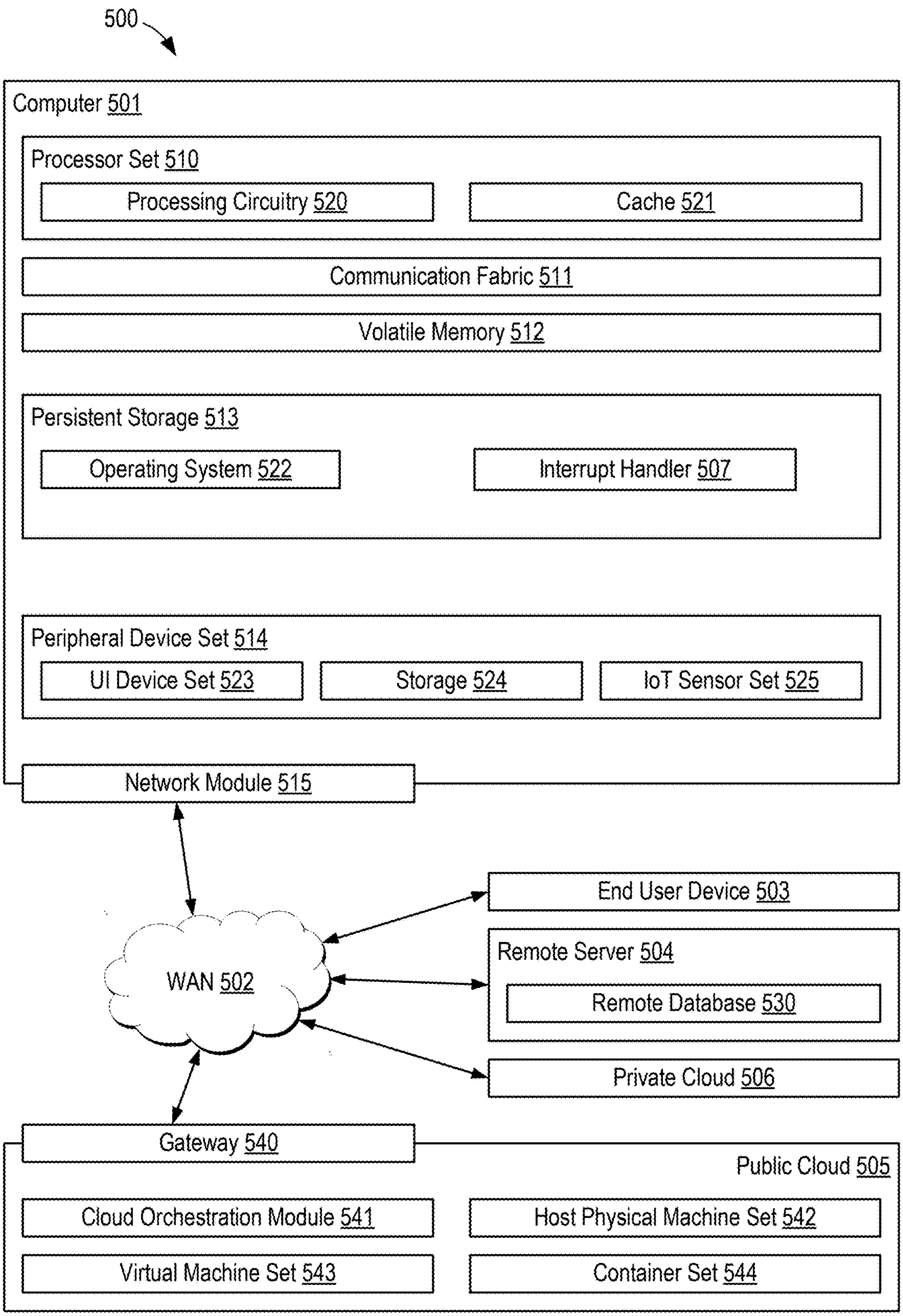
FIG. 5 sets forth a block diagram of an example computing environment for utilizing kernel thread dispatch latency for input/output processing in accordance with at least one embodiment of the present disclosure.

FIG. 5 sets forth an example computing environment according to aspects of the present disclosure. Computing environment 500 contains an example of an environment for the execution of at least some of the computer code involved in performing the various methods described herein, such as interrupt handler 507. In addition to interrupt handler 507, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and interrupt handler 507, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 521 and the other storage media discussed below. The program instructions, and associated data, are accessed by processor set 510 to control and direct performance of the computer-implemented methods. In computing environment 500, at least some of the instructions for performing the computer-implemented methods may be stored in interrupt handler 507 in persistent storage 513.

Communication fabric 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in interrupt handler 507 typically includes at least some of the computer code involved in performing the computer-implemented methods described herein.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database), this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the computer-implemented methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

executing an interrupt handler in response to an interrupt raised by an input/output (I/O) adapter;

waking up, by the interrupt handler and in response to the interrupt, a kernel thread configured for I/O processing;

processing, by the interrupt handler while waiting for an acknowledgement by the kernel thread, one or more I/O events of a plurality of I/O events in an I/O queue for the I/O adapter, wherein the interrupt handler begins processing the one or more I/O events parallelly with respect to waking up the kernel thread;

transferring, by the interrupt handler, I/O processing to the kernel thread in response to detecting the acknowledgement by the kernel thread, wherein the acknowledgement indicates that the kernel thread has begun executing; and processing, by the kernel thread, remaining I/O events in the I/O queue.

2. The method of claim 1, wherein the plurality of I/O events are I/O completions and the I/O queue is an I/O completion queue.

3. The method of claim 1 further comprising:

acknowledging, by the kernel thread, completion of the I/O processing to the I/O adapter.

4. The method of claim 3, wherein acknowledging the completion of the I/O processing indicates an aggregate quantity of I/O events processed by the interrupt handler and the kernel thread.

5. The method of claim 4, wherein the interrupt handler and the kernel thread update a shared counter for each I/O event that is processed.

6. The method of claim 1 further comprising:

acknowledging, by the interrupt handler, completion of the I/O processing to the I/O adapter when the interrupt handler processes all I/O events in the I/O queue prior to detecting the acknowledgement by the kernel thread.

7. The method of claim 1, wherein the kernel thread is woken up prior to the interrupt handler processing of any I/O events.

8. The method of claim 1, wherein the interrupt handler wakes up the kernel thread by calling a wakeup function for the kernel thread.

9. A computer system comprising:

a processor set;

one or more computer-readable storage media; and program instructions stored on the one or more storage media to cause the processor set to perform operations comprising:

executing an interrupt handler in response to an interrupt raised by an input/output (I/O) adapter;

waking up, by the interrupt handler, a kernel thread configured for I/O processing in response to the interrupt;

processing, by the interrupt handler while waiting for an acknowledgement by the kernel thread, one or more I/O events of a plurality of I/O events in an I/O queue for the I/O adapter, wherein the interrupt handler begins processing the one or more I/O events parallelly with respect to waking up the kernel thread;

transferring, by the interrupt handler, I/O processing to the kernel thread in response to detecting the acknowledgement by the kernel thread, wherein the acknowledgement indicates that the kernel thread has begun executing; and processing, by the kernel thread, remaining I/O events in the I/O queue.

10. The computer system of claim 9, wherein the plurality of I/O events are I/O completions and the I/O queue is an I/O completion queue.

11. The computer system of claim 9, said operations further comprising:

acknowledging, by the kernel thread, completion of the I/O processing to the I/O adapter.

12. The computer system of claim 11, wherein acknowledging the completion of the I/O processing indicates an aggregate quantity of I/O events processed by the interrupt handler and the kernel thread.

13. The computer system of claim 12, wherein the interrupt handler and the kernel thread update a shared counter for each I/O event that is processed.

14. The computer system of claim 9 said instructions further comprising:

acknowledging, by the interrupt handler, completion of the I/O processing to the I/O adapter when the interrupt handler processes all I/O events in the I/O queue prior to detecting the acknowledgement by the kernel thread.

15. The computer system of claim 9, wherein the kernel thread is woken up prior to the interrupt handler processing of any I/O events.

16. The computer system of claim 9, wherein the interrupt handler wakes up the kernel thread by calling a wakeup function for the kernel thread.

17. A computer program product comprising:

one or more non-transitory computer-readable storage media; and program instructions stored on the one or more non-transitory computer-readable storage media to perform operations comprising:

executing an interrupt handler in response to an interrupt raised by an input/output (I/O) adapter;

waking up, by the interrupt handler and in response to the interrupt, a kernel thread configured for I/O processing;

processing, by the interrupt handler while waiting for an acknowledgement by the kernel thread, one or more I/O events of a plurality of I/O events in an I/O queue for the I/O adapter, wherein the interrupt handler begins processing the one or more I/O events parallelly with respect to waking up the kernel thread;

transferring, by the interrupt handler, I/O processing to the kernel thread in response to detecting the acknowledgement by the kernel thread, wherein the acknowledgement indicates that the kernel thread has begun executing; and processing, by the kernel thread, remaining I/O events in the I/O queue.

18. The computer program product of claim 17, wherein the plurality of I/O events are I/O completions and the I/O queue is an I/O completion queue.

19. The computer program product of claim 18, said operations further comprising:

acknowledging, by the kernel thread, completion of the I/O processing to the I/O adapter.

20. The computer program product of claim 19, wherein the acknowledgement acknowledging the completion indicates an aggregate quantity of I/O events processed by the interrupt handler and the kernel thread.

* * * * *